United States Patent
Tasaki et al.

(10) Patent No.: US 12,477,439 B2
(45) Date of Patent: Nov. 18, 2025

(54) INFORMATION PROCESSING METHOD, INFORMATION PROCESSING DEVICE, AND NON-TRANSITORY COMPUTER READABLE RECORDING MEDIUM STORING INFORMATION PROCESSING PROGRAM FOR SPECIFYING A LOCATION WHERE MULTIPLE MOBILITIES STOP

(71) Applicant: PANASONIC INTELLECTUAL PROPERTY CORPORATION OF AMERICA, Torrance, CA (US)

(72) Inventors: Nobuaki Tasaki, Osaka (JP); Masahiro Taguchi, Osaka (JP); Ayaka Mitani, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 413 days.

(21) Appl. No.: 18/087,549

(22) Filed: Dec. 22, 2022

(65) Prior Publication Data
US 2023/0126289 A1    Apr. 27, 2023

Related U.S. Application Data

(63) Continuation of application No. PCT/JP2021/022061, filed on Jun. 10, 2021.

(30) Foreign Application Priority Data
Jul. 1, 2020  (JP) .................. 2020-113899

(51) Int. Cl.
H04W 48/04    (2009.01)
H04W 8/18    (2009.01)

(52) U.S. Cl.
CPC ........... *H04W 48/04* (2013.01); *H04W 8/186* (2013.01)

(58) Field of Classification Search
CPC ....... H04W 48/04; H04W 8/186; H04W 4/80; H04W 4/029; H04W 4/08; G01S 5/0072;
(Continued)

(56) References Cited

U.S. PATENT DOCUMENTS

| | | | |
|---|---|---|---|
| 2014/0149156 A1* | 5/2014 | Schroeder | G06Q 10/02 705/5 |
| 2016/0300400 A1* | 10/2016 | Namikawa | G06Q 30/0284 |
| 2017/0270801 A1* | 9/2017 | Kurata | G06F 3/14 |

FOREIGN PATENT DOCUMENTS

| | | |
|---|---|---|
| JP | 2009-272951 | 11/2009 |
| JP | 2019-032310 | 2/2019 |
| JP | 2020-024644 | 2/2020 |

OTHER PUBLICATIONS

International Search Report issued in International Patent Application No. PCT/JP2021/022061, dated Aug. 31, 2021, along with an English translation thereof.

* cited by examiner

*Primary Examiner* — Brandon J Miller
(74) *Attorney, Agent, or Firm* — Greenblum & Bernstein, P.L.C.

(57) ABSTRACT

A server device acquires location information indicating a location of a mobility, identification information on another mobility, the identification information being received from the other mobility by near field communication, and stop information indicating whether the mobility stops, from multiple mobilities; classifies two or more mobilities into a same mobility group, the two or more mobilities stopping and mutually receiving the identification information among the multiple mobilities; and specifies a stop place where the (Continued)

mobility group stops based on the location information on the two or more mobilities classified into the mobility group.

11 Claims, 8 Drawing Sheets

(58) Field of Classification Search
CPC ........ G01S 5/0027; G01S 5/017; G01S 19/14; G01S 19/48; G08G 1/205
See application file for complete search history.

INFORMATION PROCESSING METHOD, INFORMATION PROCESSING DEVICE, AND NON-TRANSITORY COMPUTER READABLE RECORDING MEDIUM STORING INFORMATION PROCESSING PROGRAM FOR SPECIFYING A LOCATION WHERE MULTIPLE MOBILITIES STOP

TECHNICAL FIELD

The present disclosure relates to a technique for specifying a location where multiple mobilities stop.

BACKGROUND ART

The global positioning system (GPS) is conventionally used to measure a location of a mobility. The mobility includes a GPS receiver that measures a current location by receiving a GPS signal transmitted from a GPS satellite. Thus, measurement accuracy of the location using the GPS depends on a radio wave condition. For example, the radio wave condition is poor at a place such as around a lower portion of a building, so that the measurement accuracy of the location using the GPS deteriorates.

For example, Patent Literature 1 discloses a beacon device that is installed in a waiting place, and that transmits a signal including a beacon device ID for identifying the beacon device to the surroundings. When a vehicle enters the waiting place, a communication terminal moving together with the vehicle receives the signal from the beacon device, and transmits the beacon device ID included in the received signal and a communication terminal ID for identifying the communication terminal to a server. When receiving the beacon device ID and the communication terminal ID, the server detects that the vehicle equipped with the communication terminal specified by the communication terminal ID has entered the waiting place specified by the beacon device ID.

For example, Patent Literature 2 discloses a positioning device that measures a location of the positioning device by using a GPS signal from a mobile terminal in a line-of-sight environment as viewed from the positioning device to obtain location information when four GPS signals cannot be received from a GPS satellite.

Unfortunately, the conventional techniques described above require installing equipment for specifying with high accuracy a stop place where a mobility stops, near the stop place, and thus are required to be further improved.

CITATION LIST

Patent Literature

Patent Literature 1: JP 2020-24644 A
Patent Literature 2: JP 2019-32310 A

SUMMARY OF INVENTION

The present disclosure is made to solve the above problems, and an object thereof is to provide a technique capable of specifying a stop place, where two or more mobilities stop, with high accuracy.

An information processing method according to an aspect of the present disclosure includes, by a computer: acquiring location information indicating a location of a mobility, identification information on another mobility, the identification information being received from the other mobility by near field communication, and stop information indicating whether the mobility stops, from multiple mobilities; classifying two or more mobilities into a same mobility group, the two or more mobilities stopping and mutually receiving the identification information among the multiple mobilities; and specifying a stop place where the mobility group stops based on the location information on the two or more mobilities classified into the mobility group.

The present disclosure enables specifying a stop place, where two or more mobilities stop, with high accuracy.

Figure 1:
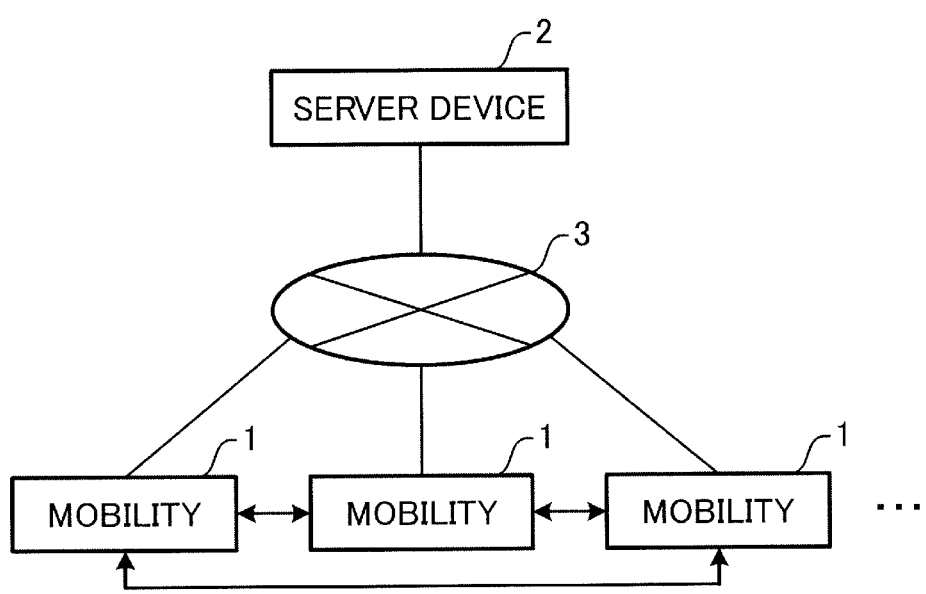
FIG. 1 is a diagram illustrating a general configuration of a mobility management system according to an embodiment of the present disclosure.

DESCRIPTION OF EMBODIMENTS (Underlying Knowledge of Present Disclosure)

In recent years, a service for sharing a bicycle by multiple users has been provided. Such a service allows the bicycle to be lent out from a bicycle-parking place provided in advance and to be returned to the bicycle-parking place. The bicycle is equipped with a GPS receiver, and a location of the bicycle is measured using a GPS signal received by the GPS receiver. The bicycle is managed by a server that manages the location of the bicycle using location information received from the bicycle.

Here, when the bicycle-parking place is provided in a place with poor radio wave conditions such as around a lower portion of a building, measurement accuracy of a location of a bicycle parked in the bicycle-parking place deteriorates. This case causes the server to be less likely to check whether the bicycle is correctly returned to the predetermined bicycle-parking place.

The technique of Patent Literature 1 described above enables checking that a vehicle has entered a waiting place using the beacon device. Unfortunately, when this technique is used, the beacon device is required to be installed in each bicycle-parking place, and timing of replacing a battery of the beacon device is required to be managed.

The technique of Patent Literature 2 described above allows the positioning device to perform positioning using a GPS signal received from another mobile terminal as a pseudo satellite. Unfortunately, this case requires equipment installation on the ground, and the equipment installation is costly.

To solve the above problems, an information processing method according to an aspect of the present disclosure includes, by a computer: acquiring location information indicating a location of a mobility, identification information on another mobility, the identification information being received from the other mobility by near field communication, and stop information indicating whether the mobility stops, from multiple mobilities; classifying two or more mobilities into a same mobility group, the two or more mobilities stopping and mutually receiving the identification information among the multiple mobilities; and specifying a stop place where the mobility group stops based on the location information on the two or more mobilities classified into the mobility group.

This configuration enables estimating two or more mobilities, which can communicate with each other by near field communication, to be present at the same place, so that the two or more mobilities can be classified into the same mobility group. Thus, even when the stop place has a poor radio wave condition and the two or more mobilities stopping at the stop place vary in location information, the stop place where the mobility group stops is specified based on the location information on the two or more mobilities that are classified into the same mobility group and that mutually receive identification information by near field communication. This configuration thus enables specifying a stop place, where two or more mobilities stop, with high accuracy.

The above information processing method may be configured such that the specifying the stop place includes: calculating medians of coordinates of the two or more mobilities; calculating a moving average of the calculated medians within a predetermined period; calculating a stop probability indicating a probability that the mobility group stops at the stop place in accordance with a distance between a calculated moving average value and coordinates of a stop place closest to the moving average value; and specifying the stop place closest to the moving average value as the stop place where the mobility group stops when the stop probability is equal to or more than a threshold.

This configuration increases the stop probability indicating the probability that the mobility group stops at the stop place as the distance between the moving average value of the medians of the coordinates of two or more mobilities within the predetermined period and the coordinates of the stop place closest to the moving average value decreases. This configuration thus enables specifying a stop place easily, where two or more mobilities stop, by comparing the stop probability with the threshold.

The above information processing method may further include specifying a stop place where one mobility among the multiple mobilities stops based on multiple pieces of location information on the one mobility stopping and that has not received the identification information of the other mobility, and that has a variation in the multiple pieces of location information acquired at predetermined time intervals.

This configuration allows a stop place, where one mobility stops, to be specified based on multiple pieces of location information on the one mobility, even when the stop place has a poor radio wave condition and a variation in the multiple pieces of location information on the one mobility stopping at the stop place, being acquired at predetermined time intervals. This configuration thus enables specifying a stop place, where one mobility stops, with high accuracy.

The above information processing method may be configured such that the specifying the stop place includes: calculating medians of multiple coordinates of the one mobility, being acquired at predetermined time intervals; calculating a moving average of the calculated medians within a predetermined period; calculating a stop probability indicating a probability that the one mobility stops at the stop place in accordance with a distance between a calculated moving average value and coordinates of a stop place closest to the moving average value; and specifying the stop place closest to the moving average value as the stop place where the one mobility stops when the stop probability is equal to or more than a threshold.

This configuration increases the stop probability indicating the probability that the one mobility stops at the stop place as the distance between the moving average value of the medians of the multiple coordinates of the one mobility within the predetermined period, being acquired at predetermined time intervals, and the coordinates of the stop place closest to the moving average value decreases. This configuration thus enables specifying a stop place easily, where one mobility stops, by comparing the stop probability with the threshold.

The above information processing method may further include: when identification information on any one of the two or more mobilities is acquired from an additional mobility that is not classified into the mobility group, classifying the additional mobility into the same mobility group as the two or more mobilities; and specifying the stop place where the mobility group stops as a stop place where the additional mobility stops.

This configuration enables specifying the stop place easily where the additional mobility stops because the stop place where the mobility group stops is specified as the stop place where the additional mobility stops when the additional mobility stops within a communicable distance with the mobility group by near field communication.

The above information processing method may further include: calculating a magnitude of a variation in the location information on the two or more mobilities classified into the mobility group, wherein in the step of specifying the stop place, when the calculated magnitude of the variation is larger than a threshold, the stop place where the mobility group stops may be specified based on the location information on the two or more mobilities classified into the mobility group.

That is, the magnitude of the variation in the location information on the two or more mobilities classified into the mobility group, the magnitude being equal to or less than the threshold, means that the two or more mobilities have no variation in locations and each have location information measured correctly. Thus, when the magnitude of the variation in the location information on the two or more mobilities is equal to or less than the threshold, processing of specifying the stop place where the mobility group stops is not performed, and only when the magnitude of the variation in the location information on the two or more mobilities is larger than the threshold, a radio wave condition around the stop place is determined to be poor, and the processing of specifying the stop place where the mobility group stops can be performed. As a result, a processing load on the computer can be reduced.

The above information processing method may further include: calculating a magnitude of a variation in distance between the corresponding two or more mobilities classified into the mobility group, and wherein in the specifying the stop place, the calculated magnitude of the variation is larger than a threshold, the stop place where the mobility group stops may be specified based on the location information on the two or more mobilities classified into the mobility group.

That is, the magnitude of the variation in distance between the corresponding two or more mobilities classified into the mobility group, the magnitude being equal to or less than the threshold, means that the two or more mobilities have no variation in locations and each have location information measured correctly. Thus, when the magnitude of the variation in distance between the corresponding two or more mobilities is equal to or less than the threshold, the processing of specifying the stop place where the mobility group stops is not performed, and only when the magnitude of the variation in distance between the corresponding two or more mobilities is larger than the threshold, the processing of specifying the stop place where the mobility group stops can be performed. As a result, a processing load on the computer can be reduced.

The above information processing method may further include: calculating a magnitude of a variation in distance between each of the two or more mobilities classified into the mobility group and the stop place existing around the two or more mobilities, and when the calculated magnitude of the variation is larger than a threshold, the stop place where the mobility group stops may be specified based on the location information on the two or more mobilities classified into the mobility group in the step of specifying the stop place.

That is, the magnitude of the variation in distance between each of the two or more mobilities classified into the mobility group and the stop place existing around the two or more mobilities, the magnitude being equal to or less than the threshold, means that the two or more mobilities have no variation in locations and each have location information measured correctly. Thus, when the magnitude of the variation in distance between each of the two or more mobilities classified into the mobility group and the stop place existing around the two or more mobilities is equal to or less than the threshold, the processing of specifying the stop place where the mobility group stops is not performed, and only when the magnitude of the variation in distance between each of the two or more mobilities classified into the mobility group and the stop place existing around the two or more mobilities is larger than the threshold, the processing of specifying the stop place where the mobility group stops can be performed. As a result, a processing load on the computer can be reduced.

The above information processing method may further include: calculating a magnitude of a variation in the location information on the two or more mobilities classified into the mobility group; and estimating a place where the mobility group stops based on the location information on the two or more mobilities classified into the mobility group when the calculated magnitude of the variation is larger than a threshold.

This configuration allows the place where the mobility group stops to be estimated based on the location information on the two or more mobilities classified into the mobility group when the magnitude of the variation in the location information on the two or more mobilities classified into the mobility group is larger than the threshold. This configuration enables estimating not only a stop place provided in advance, but also a place where the mobility group stops other than the stop place. For example, a location of a mobility returned at a place other than the stop place can be specified.

An information processing device according to another aspect of the present disclosure includes: an acquisition unit that acquires location information indicating a location of a mobility, identification information on another mobility, the identification information being received from the other mobility by near field communication, and stop information indicating whether the mobility stops, from multiple mobilities; a classifier that classifies two or more mobilities into a same mobility group, the two or more mobilities stopping and mutually receiving the identification information among the multiple mobilities; and a specifying unit that specifies a stop place where the mobility group stops based on the location information on the two or more mobilities classified into the mobility group.

This configuration enables estimating two or more mobilities, which can communicate with each other by near field communication, to be present at the same place, so that the two or more mobilities can be classified into the same mobility group. Thus, even when the stop place has a poor radio wave condition and the two or more mobilities stopping at the stop place vary in location information, the stop place where the mobility group stops is specified based on the location information on the two or more mobilities that are classified into the same mobility group and that mutually receive identification information by near field communication. This configuration thus enables specifying a stop place, where two or more mobilities stop, with high accuracy.

A non-transitory computer readable recording medium storing an information processing program according to yet another aspect of the present disclosure causes a computer to execute functions of: acquiring location information indicating a location of a mobility, identification information on another mobility, the identification information being received from the other mobility by near field communication, and stop information indicating whether the mobility stops, from multiple mobilities; classifying two or more mobilities into a same mobility group, the two or more mobilities stopping and mutually receiving the identification information among the multiple mobilities; and specifying a stop place where the mobility group stops based on the location information on the two or more mobilities classified into the mobility group.

This configuration enables estimating two or more mobilities, which can communicate with each other by near field communication, to be present at the same place, so that the two or more mobilities can be classified into the same mobility group. Thus, even when the stop place has a poor radio wave condition and the two or more mobilities stopping at the stop place vary in location information, the stop place where the mobility group stops is specified based on the location information on the two or more mobilities that are classified into the same mobility group and that mutually receive identification information by near field communication. This configuration thus enables specifying a stop place, where two or more mobilities stop, with high accuracy.

An embodiment of the present disclosure will be described below with reference to the accompanying drawings. The embodiment below is an example in which the present disclosure is embodied, and is not intended to limit the technical scope of the present disclosure.

EMBODIMENT

FIG. 1 is a diagram illustrating a general configuration of a mobility management system according to an embodiment of the present disclosure.

FIG. 1 illustrates a mobility management system that includes multiple mobilities 1 and a server device 2.

Each mobility 1 is a power-assisted bicycle, for example, and can be exclusively used by an individual during movement. The mobility 1 is shared by multiple users. The mobility 1 is operated by a user. The mobility 1 is lent out at a predetermined parking place (stop place) and returned at a predetermined parking place. Multiple parking places are provided in an urban area. The parking place enables multiple mobilities 1 to be parked and a mobility 1 to be charged. The mobility 1 is to be returned to a parking place that is not necessarily identical to a parking place where the mobility 1 is lent out. The mobility 1 is communicably connected to the server device 2 via a network 3. The network 3 is the Internet, for example.

The mobility 1 periodically transmits a mobility ID for identifying the mobility 1 by near field communication. Examples of the near field communication include Bluetooth Low Energy (BLE) that is one of communication modes of Bluetooth (registered trademark). The mobility 1 broadcasts the mobility ID by the near field communication. The mobility 1 broadcasts the mobility ID every second, for example. The near field communication achieves a signal arrival range of 10 meters, for example. The mobility 1 receives a mobility ID transmitted by another mobility. When receiving the mobility ID transmitted by the other mobility, the mobility 1 can recognize that the other mobility exists within a signal arrival range.

For example, a first mobility broadcasts a first mobility ID by the near field communication, and a second mobility broadcasts a second mobility ID by the near field communication. In this case, when the second mobility enters the signal arrival range of the near field communication of the first mobility, the first mobility receives the second mobility ID broadcast by the second mobility. Then, the first mobility also enters the signal arrival range of the near field communication of the second mobility, so that the second mobility receives the first mobility ID broadcast by the first mobility. As described above, the first mobility and the second mobility existing within the signal arrival range of the near field communication mutually receive the corresponding mobilities ID.

The mobility 1 may be a bicycle without power-assist. The mobility 1 may be also an electric vehicle, an electric motorcycle, an automobile including an internal combustion engine, or a motorcycle including an internal combustion engine.

When using a mobility 1, a user inputs reservation information for reserving use of the mobility 1 to an information terminal (not illustrated). The reservation information includes a user ID for identifying the user, a use start time, a use end time, a lent place, and a return place. The information terminal is a smartphone, a tablet computer, or a personal computer, for example, and is used by a user who rides on the mobility 1. The information terminal receives the reservation information for reserving the use of the mobility 1, being input by the user. The information terminal transmits the input reservation information to the server device 2.

The server device 2 is a Web server, for example. The server device 2 receives various types of information from the mobility 1 and transmits various types of information to the mobility 1.

Figure 2:
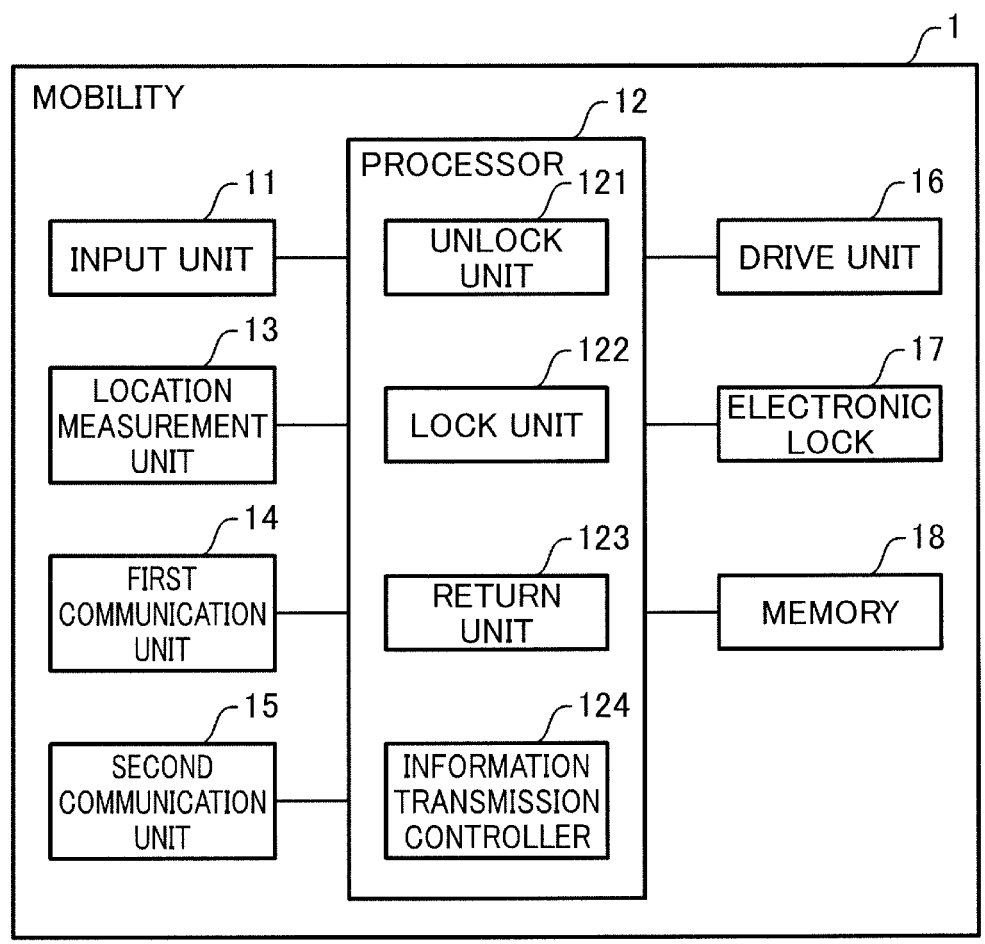
FIG. 2 is a diagram illustrating an example of a configuration of a mobility according to an embodiment of the present disclosure.

FIG. 2 is a diagram illustrating an example of a configuration of a mobility according to the embodiment of the present disclosure.

The mobility 1 illustrated in FIG. 2 includes an input unit 11, a processor 12, a location measurement unit 13, a first communication unit 14, a second communication unit 15, a drive unit 16, an electronic lock 17, and a memory 18.

The input unit 11 receives a driving operation of the mobility 1 with the user. The input unit 11 receives also an unlock operation, a lock operation, and a return operation of the mobility 1 with the user. For example, the input unit 11 includes a numeric keypad, an unlock button, a lock button, and a return button. The numeric keypad receives an input of a password for unlocking the mobility 1. The unlock button receives an unlock operation of the mobility 1 with the user after the input of the password. The lock button receives a lock operation of the mobility 1 with the user. The return button receives a return operation of the mobility 1 with the user after locking.

The lock operation and the unlock operation of the mobility 1 may be performed by using a two-dimensional barcode, an IC card reader, or the like.

The location measurement unit 13 receives a GPS signal, and measures a current location of the mobility 1 using the received GPS signal. The current location is represented by latitude and longitude. As described above, measurement accuracy of the current location may deteriorate at a place with a poor radio wave condition such as a place around a lower portion of a building due to time difference in a GPS signal or deterioration in an S/N ratio of a GPS signal.

The first communication unit 14 periodically broadcasts a mobility ID for identifying the mobility 1 by the near field communication. The first communication unit 14 also receives a mobility ID broadcast by another mobility 1 by the near field communication.

The electronic lock 17 is electrically locked and unlocked.

The memory 18 is a semiconductor memory, for example, and stores in advance a mobility ID for identifying a mobility 1.

The processor 12 is a central processing unit (CPU), for example, and includes an unlock unit 121, a lock unit 122, a return unit 123, and an information transmission controller 124.

When the user inputs a password and presses the unlock button, the unlock unit 121 transmits the input password and the mobility ID for identifying the mobility 1 to the server device 2 via the second communication unit 15. When the second communication unit 15 receives an unlock signal, the unlock unit 121 unlocks the electronic lock 17 of the mobility 1.

When the user presses the lock button, the lock unit 122 locks the electronic lock 17 of the mobility 1.

The unlock unit 121 and the lock unit 122 according to the present embodiment are only required to be able to detect a state of unlock and lock of the electronic lock 17, and are not limited to the above configuration. Although the mobility 1 according to the present embodiment is electrically locked and unlocked by the electronic lock 17, the present disclosure is not particularly limited thereto, and the mobility 1 may not have a function of being electrically locked and unlocked.

When the user presses the return button, the return unit 123 transmits a return signal, which indicates that driving of the mobility 1 is ended and the mobility 1 is returned, to the server device 2 via the second communication unit 15.

The information transmission controller 124 transmits location information indicating a location of the mobility 1 measured by the location measurement unit 13, the mobility ID of the other mobility received by the first communication unit 14, and stop information indicating whether the mobility 1 stops to the server device 2 via the second communication unit 15. When a mobility ID of another mobility is not received, the information transmission controller 124 transmits only the location information and the stop information to the server device 2 via the second communication unit 15.

When the mobility 1 is locked by the lock unit 122, the information transmission controller 124 determines that the mobility 1 stops, and generates stop information indicating that the mobility 1 stops. When the mobility 1 has a speed of 0, the information transmission controller 124 may determine that the mobility 1 stops and generate the stop information indicating that the mobility 1 stops. When the mobility 1 has an engine that stops, the information transmission controller 124 may determine that the mobility 1 stops and generate the stop information indicating that the mobility 1 stops. In this case, the mobility 1 is an automobile or a motorcycle, for example. When a return signal is transmitted, the information transmission controller 124 may determine that the mobility 1 stops and generate the stop information indicating that the mobility 1 stops.

The second communication unit 15 transmits various types of information to the server device 2 and receives various types of information from the server device 2. The second communication unit 15 transmits a password and a mobility ID to the server device 2. The second communication unit 15 receives an unlock signal transmitted by the server device 2. The second communication unit 15 also transmits a return signal to the server device 2. The second communication unit 15 also transmits information to the server device 2, the information including: the location information indicating a location of the mobility 1; the mobility ID of another mobility received by the mobility 1 from the other mobility by the near field communication; and stop information indicating whether the mobility 1 stops. When a mobility ID of another mobility is not received, the second communication unit 15 transmits only the location information and the stop information to the server device 2.

The drive unit 16 is an electric motor, for example, and the electric motor is driven to rotate a wheel of the mobility 1.

Figure 3:
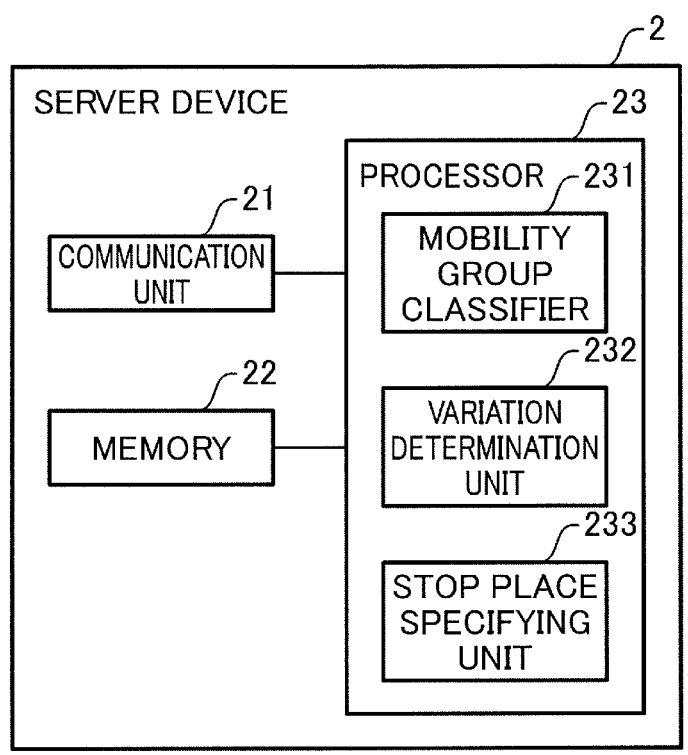
FIG. 3 is a diagram illustrating an example of a configuration of a server device according to an embodiment of the present disclosure.

FIG. 3 is a diagram illustrating an example of a configuration of a server device according to the embodiment of the present disclosure.

The server device 2 illustrated in FIG. 3 includes a communication unit 21, a memory 22, and a processor 23.

The communication unit 21 acquires information from multiple mobilities 1, the information including: location information indicating a location of a mobility 1; a mobility ID (identification information) of another mobility 1 received by the mobility 1 from the other mobility 1 by the near field communication; and stop information indicating whether the mobility 1 stops. The communication unit 21 receives the information from the multiple mobilities 1, the information including the location information on the mobility 1, the mobility ID of another mobility, and the stop information on the mobility 1.

The communication unit 21 also transmits a password for unlocking the electronic lock 17 of the mobility 1 to an information terminal. The communication unit 21 receives a password and a mobility ID transmitted by the mobility 1. The communication unit 21 transmits an unlock signal to the mobility 1. The communication unit 21 receives a return signal transmitted by the mobility 1.

The memory 22 is a semiconductor memory or a hard disk drive, for example, and stores mobility information and mobility group information. The mobility information includes a mobility ID of a mobility, location information on the mobility, a mobility ID of another mobility received by the mobility by the near field communication, and stop information on the mobility, which are associated with each other. The mobility group information includes a mobility group ID for identifying a mobility group, a mobility ID of each of multiple mobilities belonging to the mobility group, medians of coordinates of each mobility, and a moving average value of the medians, which are associated with each other.

The processor 23 is a CPU, for example, and includes a mobility group classifier 231, a variation determination unit 232, and a stop place specifying unit 233.

The mobility group classifier 231 classifies two or more mobilities 1 stopping and mutually receiving a mobility ID into the same mobility group, among the multiple mobilities 1. The mobility group classifier 231 generates a mobility group ID for identifying the mobility group into which the two or more mobilities 1 are classified, and stores the mobility group information in which the mobility group ID is associated with mobility IDs of the two or more mobility 1 classified into the mobility group in the memory 22.

The stop information may indicate not only whether the mobility 1 stops but also whether the mobility 1 is locked. In this case, the mobility group classifier 231 classifies two or more mobilities that are locked and mutually receive a mobility ID into the same mobility group, among the multiple mobilities 1.

The stop information may indicate not only whether the mobility 1 stops but also whether the mobility 1 is returned. In this case, the mobility group classifier 231 classifies two or more mobilities 1 that are returned and mutually receive a mobility ID into the same mobility group, among the multiple mobilities 1.

The variation determination unit 232 calculates a magnitude of a variation in the location information on the two or more mobilities 1 classified into the mobility group. The variation determination unit 232 determines whether the calculated magnitude of the variation is larger than a threshold. The magnitude of the variation is a standard deviation, for example. The variation determination unit 232 calculates a standard deviation of coordinates of the two or more mobilities 1 classified into the mobility group to determine whether the calculated standard deviation is larger than the threshold. The magnitude of the variation may be a variance value, for example.

The stop place specifying unit 233 specifies a stop place where the mobility group stops based on the location information on the two or more mobilities 1 classified into the mobility group. When the magnitude of the variation calculated by the variation determination unit 232 is larger than the threshold, the stop place specifying unit 233 specifies a stop place where the mobility group stops based on the location information on the two or more mobilities 1 classified into the mobility group. The stop place is a parking place of the mobility 1, and a parking place where the mobility 1 is to be returned, for example.

Multiple stop places are provided in advance. The stop place specifying unit 233 specifies a stop place where the mobility group stops among the multiple stop places provided in advance based on the location information on the two or more mobilities 1 classified into the mobility group.

Specifically, the stop place specifying unit 233 calculates a median of coordinates of the two or more mobilities 1. The stop place specifying unit 233 calculates a moving average within a predetermined period of the calculated median. The stop place specifying unit 233 calculates a stop probability indicating a probability that the mobility group stops at the stop place in accordance with a distance between a calculated moving average value and coordinates of the stop place closest to the moving average value. When the stop probability is equal to or greater than a threshold, the stop place specifying unit 233 specifies the stop place closest to the moving average value as the stop place where the mobility group stops.

The stop place specifying unit 233 also specifies a stop place where one mobility 1 stops among the multiple mobilities 1 based on multiple pieces of location information on the one mobility 1 stopping and that has not received a mobility ID of another mobility 1, and has a variation in the multiple pieces of location information acquired at predetermined time intervals.

Specifically, the stop place specifying unit 233 calculates a median of multiple coordinates acquired at predetermined time intervals of the one mobility 1. The stop place specifying unit 233 calculates a moving average within a predetermined period of the calculated median. The stop place specifying unit 233 calculates a stop probability indicating a probability that the one mobility 1 stops at the stop place in accordance with a distance between a calculated moving average value and coordinates of the stop place closest to the moving average value. When the stop probability is equal to or greater than a threshold, the stop place specifying unit 233 specifies the stop place closest to the moving average value as the stop place where the one mobility 1 stops.

When receiving the mobility ID of any one of the two or more mobilities is acquired from an additional mobility 1 that is not classified into the mobility group, the mobility group classifier 231 classifies the additional mobility 1 into the same mobility group as the two or more mobilities. Then, the stop place specifying unit 233 specifies the stop place where the mobility group stops as a stop place where the additional mobility 1 stops.

Subsequently, operation of the server device 2 according to the embodiment of the present disclosure will be described.

Figure 4:
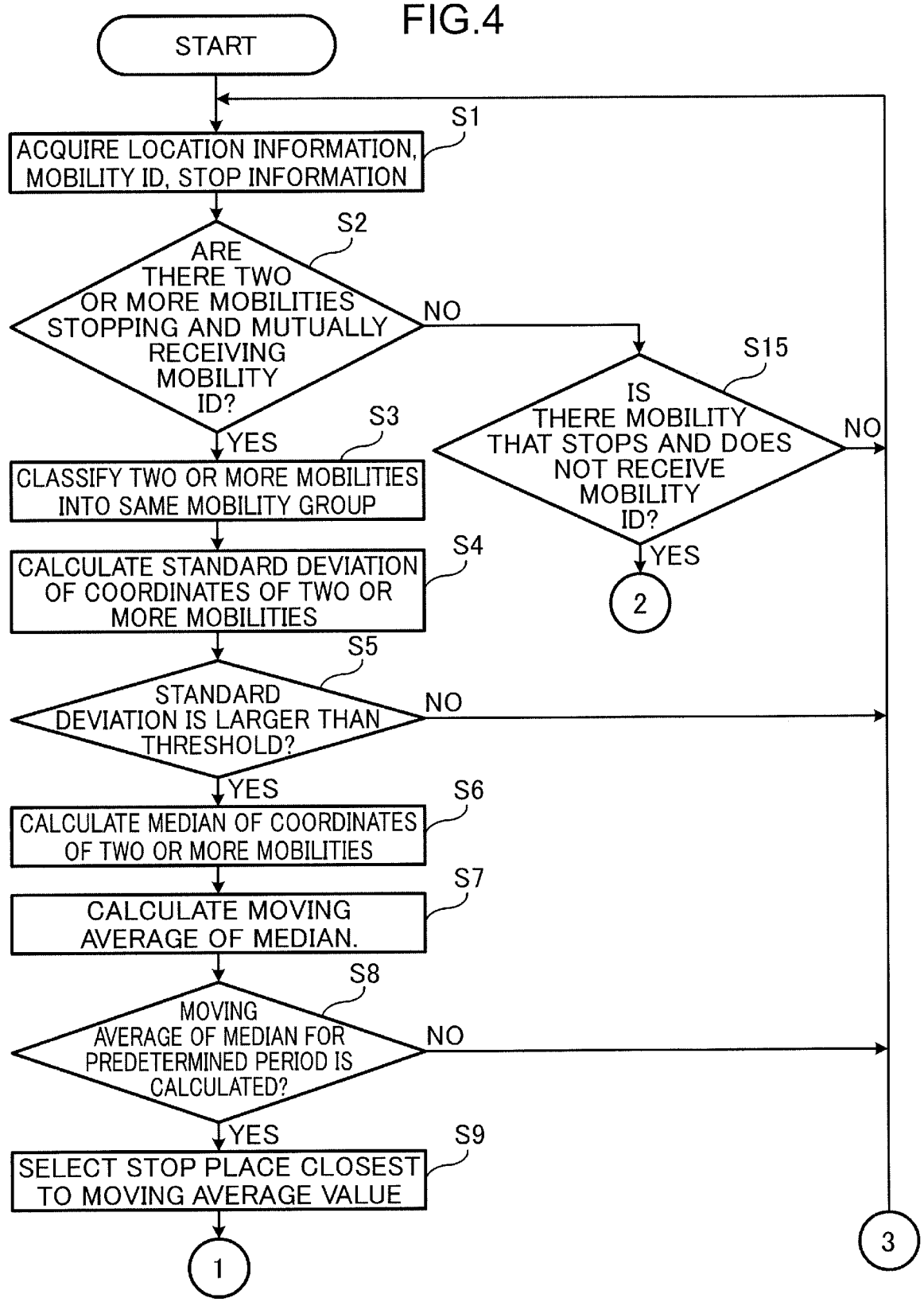
FIG. 4 is a first flowchart for illustrating an operation of a server device according to an embodiment of the present disclosure.
Figure 5:
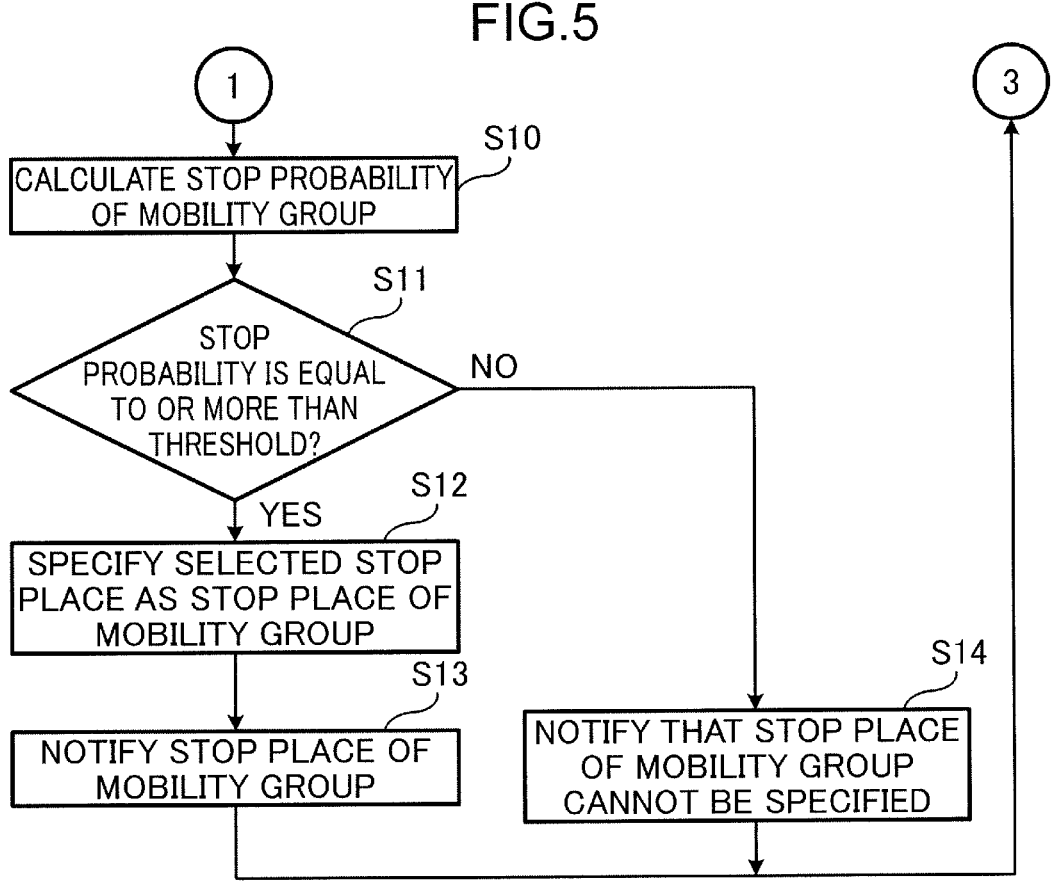
FIG. 5 is a second flowchart for illustrating the operation of the server device according to the embodiment of the present disclosure.
Figure 6:
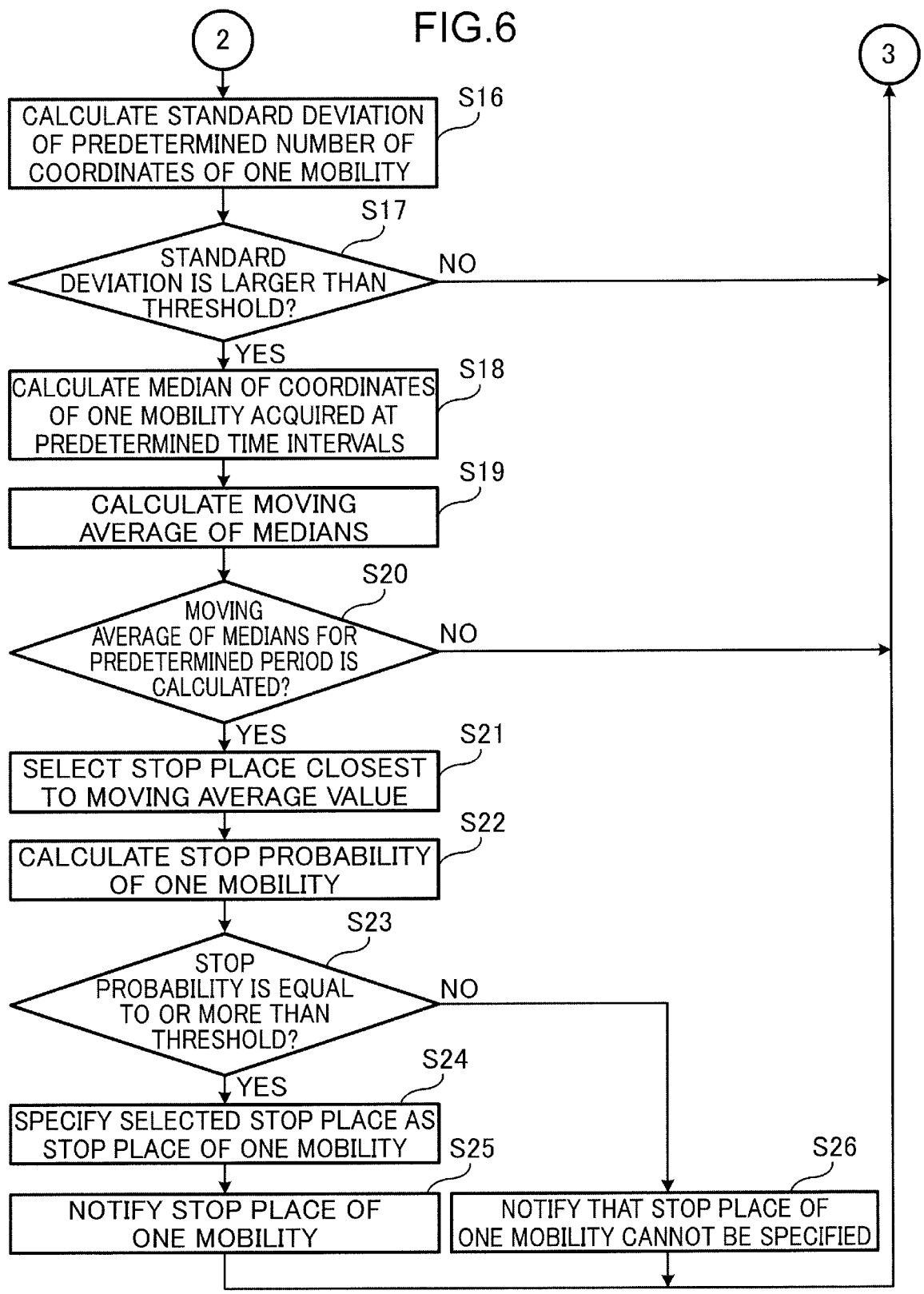
FIG. 6 is a third flowchart for illustrating the operation of the server device according to the embodiment of the present disclosure.

FIG. 4 is a first flowchart for illustrating an operation of a server device according to an embodiment of the present disclosure, FIG. 5 is a second flowchart for illustrating the operation of the server device according to the embodiment of the present disclosure, and FIG. 6 is a third flowchart for illustrating the operation of the server device according to the embodiment of the present disclosure.

In step S1, the communication unit 21 of the server device 2 first acquires information from multiple mobilities 1, the information including: location information indicating a location of a mobility 1; a mobility ID of another mobility 1 received by the mobility 1 from the other mobility 1 by the near field communication; and stop information indicating whether the mobility 1 stops. Each mobility 1 periodically transmits the location information, the mobility ID of the other mobility, and the stop information to the server device 2. The communication unit 21 periodically receives the location information, the mobility ID of the other mobility, and the stop information transmitted by each mobility 1. The communication unit 21 receives the location information, the mobility ID of the other mobility, and the stop information transmitted by each mobility 1, every minute, for example.

In subsequent step S2, the mobility group classifier 231 determines whether there are two or more mobilities 1 that stop and mutually receive a mobility ID among the multiple mobilities 1.

The mobility group classifier 231 can specify the mobility 1 stopping with reference to the stop information on the mobility 1. When the first mobility receives a mobility ID of the second mobility and the second mobility receives a mobility ID of the first mobility, for example, the mobility group classifier 231 can also specify the first mobility and the second mobility as the mobilities that mutually receive the mobility ID.

Here, when it is determined that there are two or more mobilities 1 stopping and mutually receiving the mobility ID (YES in step S2), the mobility group classifier 231 classifies the two or more mobilities 1 stopping and mutually receiving the mobility ID into the same mobility group in step S3.

In subsequent step S4, the variation determination unit 232 calculates a standard deviation of coordinates of the two or more mobilities 1 classified into the mobility group.

When the mobility 1 cannot measure location information and the communication unit 21 cannot acquire the location information, the mobility group classifier 231 may read and use the last acquired location information on the mobility 1 from the mobility information stored in the memory 22.

In subsequent step S5, the variation determination unit 232 determines whether the standard deviation is larger than a threshold. Here, when it is determined that the standard deviation is equal to or less than the threshold (NO in step S5), processing returns to step S1. That is, the standard deviation of coordinates of the two or more mobilities 1 classified into the mobility group, the standard deviation being equal to or less than the threshold, means that the two or more mobilities 1 have no variation in locations and each have location information measured correctly. Thus, when the standard deviation of the coordinates of the two or more mobilities 1 is equal to or less than the threshold, processing of specifying a stop place where the mobility group stops is unnecessary.

In contrast, when it is determined that the standard deviation is larger than the threshold (YES in step S5), the stop place specifying unit 233 calculates medians of the coordinates of the two or more mobilities 1 classified into the mobility group in step S6.

In subsequent step S7, the stop place specifying unit 233 calculates a moving average of the calculated medians.

In subsequent step S8, the stop place specifying unit 233 determines whether a moving average of the medians for a predetermined period is calculated. The predetermined period is one hour, for example. Here, when it is determined that the moving average of the medians for the predetermined period is not calculated (NO in step S8), the processing returns to step S1.

In contrast, when it is determined that the moving average of the medians for the predetermined period is calculated (YES in step S8), the stop place specifying unit 233 selects a stop place closest to a calculated moving average value from among multiple stop places provided in advance, in step S9. Then, the memory 22 stores in advance location information (coordinates) on the multiple stop places provided in advance.

In subsequent step S10, the stop place specifying unit 233 calculates a stop probability, which indicates a probability that the mobility group stops at the stop place, in accordance with a distance between the calculated moving average value and the coordinates of the selected stop place.

Here, a method for calculating a stop probability of a mobility group will be described.

Figure 7:
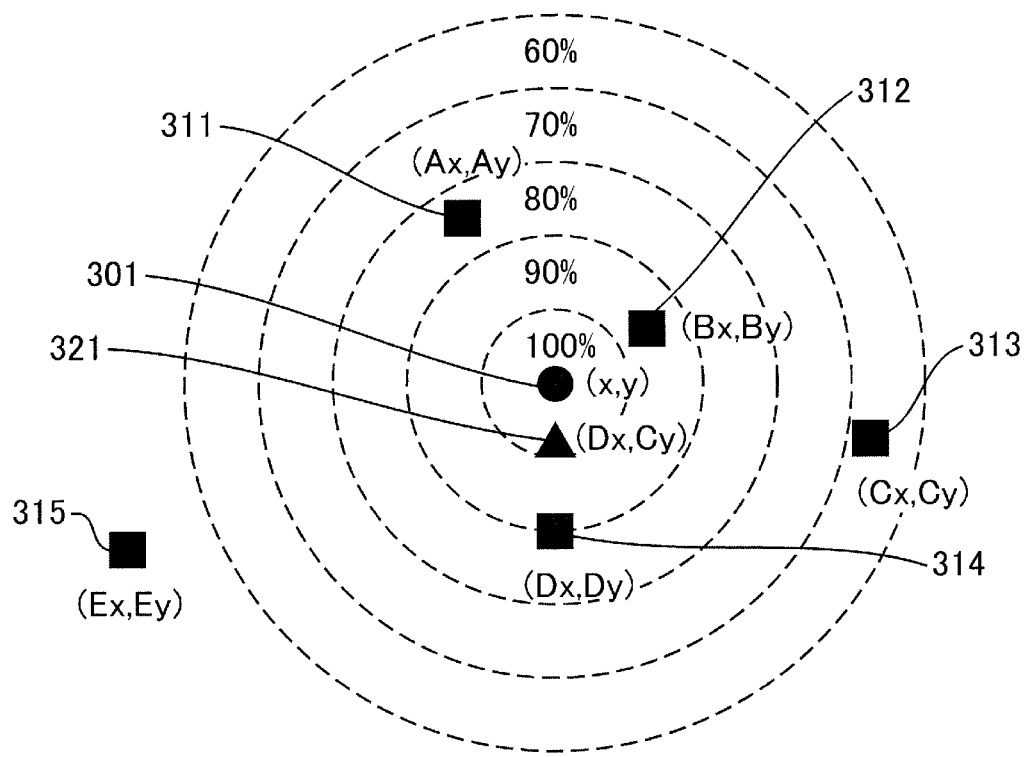
FIG. 7 is a diagram for illustrating a method for calculating a stop probability of a mobility group according to the present embodiment.

FIG. 7 is a diagram for illustrating the method for calculating a stop probability of a mobility group according to the present embodiment.

FIG. 7 illustrates a point 301 that indicates coordinates of a stop place (x, y), points 311 to 315 that respectively indicate coordinates (Ax, Ay) to (Ex, Ey) of five mobilities stopping and mutually receiving mobility IDs, and point 321 that indicates a moving average value (Dx, Cy) of medians of the coordinates of the five mobilities. FIG. 7 illustrates also multiple circles indicated by dotted lines that represent locations away from the stop place as a center by 10 m, 20 m, 30 m, 40 m, and 50 m.

When the distance between the calculated moving average value and the coordinates of the selected stop place is 10 m or less, the stop place specifying unit 233 sets the stop probability to 100%. When the distance between the calculated moving average value and the coordinates of the selected stop place is more than 10 m and 20 m or less, the stop place specifying unit 233 sets the stop probability to 90%. As described above, each time when the stop place specifying unit 233 reduces the stop probability by 10%, the distance between the calculated moving average value and the coordinates of the selected stop place increases by 10 m. The stop place specifying unit 233 raises the stop probability when the calculated moving average value is close to the selected stop place, and lowers the stop probability when the calculated moving average value is far from the selected stop place.

Returning to FIG. 5, in subsequent step S11, the stop place specifying unit 233 determines whether the calculated stop probability is equal to or more than a threshold. The threshold is 80%, for example.

Here, when it is determined that the stop probability is equal to or more than the threshold (YES in step S11), the stop place specifying unit 233 specifies the selected stop place as a stop place of the mobility group in step S12.

In subsequent step S13, the communication unit 21 notifies an administrator of the multiple mobilities 1 of the specified stop place of the mobility group. At this time, the communication unit 21 transmits the specified stop place of the mobility group and the mobility IDs of the multiple mobilities 1 classified into the mobility group to an information terminal of the administrator. The processing returns to step S1 after the processing of step S13.

When the multiple mobilities constituting the mobility group have no change after the stop probability of the mobility group is calculated, the stop place specifying unit 233 does not calculate a stop probability less than a previously calculated stop probability. When the multiple mobilities constituting the mobility group have no change after the stop probability of the mobility group is calculated, the stop place specifying unit 233 may continue to use the calculated stop probability. The stop place specifying unit 233 may further continue to use the calculated stop probability until the number of the multiple mobilities constituting the mobility group becomes zero after the stop probability of the mobility group is calculated. After the stop probability of the mobility group is calculated, the stop place specifying unit 233 may continue to use the calculated stop probability until the server device 2 is restarted.

In contrast, when it is determined that the stop probability is smaller than the threshold (NO in step S11), the communication unit 21 notifies the administrator of the multiple mobilities 1 that the stop place of the mobility group cannot be specified, in step S14. At this time, the communication unit 21 transmits information, which indicates that the stop place of the mobility group cannot be specified, to the information terminal of the administrator. The processing returns to step S1 after the processing of step S14.

When receiving the mobility ID of any one of the two or more mobilities is acquired from an additional mobility 1 that is not classified into the mobility group, the mobility group classifier 231 may classify the additional mobility 1 into the same mobility group as the two or more mobilities. Then, the stop place specifying unit 233 may specify the stop place where the mobility group stops as a stop place where the additional mobility 1 stops.

Although the stop place specifying unit 233 calculates the stop probability of the mobility group in accordance with the distance between the calculated moving average value and the coordinates of the stop place closest to the moving average value in the present embodiment, the present disclosure is not particularly limited thereto. The stop place specifying unit 233 may acquire a stop probability output from a prediction model by inputting coordinates of two or more mobilities to the prediction model. The prediction model is generated by machine learning using teacher data including coordinates measured by two or more mobilities existing around a stop place and a stop probability that two or more mobilities stop at the stop place. For example, the prediction model may be machine-learned to output a stop probability of 100% when receiving coordinates of two or more mobilities that stop at the stop place, and to output a stop probability of 0% when receiving coordinates of two or more mobilities that do not stop at the stop place. Additionally, when receiving coordinates of two or more mobilities that do not stop at the stop place, the prediction model may be machine-learned to acquire GPS variation data for one hour or the like and to reduce the stop probability by 10% as correct data every time when a distance between the coordinates of the two or more mobilities and the coordinates of the stop place increases by 10 m, for example.

The stop place specifying unit 233 also may correct a stop probability by using return information indicating that each mobility is returned. For example, when four mobilities of five mobilities classified into the mobility group are returned and one mobility is not returned, a return rate is 80%. When a calculated stop probability is 60% and a proportional ratio between a return rate and a stop probability is 50:50, the stop place specifying unit 233 may correct the stop probability to 70%.

In contrast, when it is determined in step S2 that conditions are not satisfied in which two or more mobilities 1 stop and mutually receive a mobility ID (NO in step S2), the mobility group classifier 231 determines in step S15 whether there is one mobility 1 that stops and does not receive a mobility ID among the multiple mobilities 1.

Here, when it is determined that conditions are not satisfied in which there is one mobility 1 that stops and does not receive a mobility ID (NO in step S15), the processing returns to step S1.

In contrast, when it is determined that there is one mobility 1 that stops and does not receive a mobility ID (YES in step S15), the variation determination unit 232 calculates a standard deviation of a predetermined number of coordinates of the one mobility 1 in step S16. For example, the variation determination unit 232 calculates a standard deviation of ten coordinates of the one mobility 1 based on a history of location information on the one mobility 1 stored in the memory 22.

In subsequent step S17, the variation determination unit 232 determines whether the standard deviation is larger than a threshold. Here, when it is determined that the standard deviation is equal to or less than the threshold (NO in step S17), the processing returns to step S1. That is, the standard deviation of the predetermined number of coordinates of the one mobility 1, the standard deviation being equal to or less than the threshold, means that the one mobility 1 has no variation in location and has location information measured correctly. Thus, when the standard deviation of the predetermined number of coordinates of the one mobility 1 is equal to or less than the threshold, processing of specifying a stop place where the one mobility stops is unnecessary.

In contrast, when it is determined that the standard deviation is larger than the threshold (YES in step S17), the stop place specifying unit 233 calculates a median of the coordinates of the one mobility 1 acquired at predetermined time intervals, in step S18.

In subsequent step S19, the stop place specifying unit 233 calculates a moving average of the calculated medians.

In subsequent step S20, the stop place specifying unit 233 determines whether the moving average of the medians for a predetermined period is calculated. The predetermined period is one hour, for example. Here, when it is determined that the moving average of the medians for the predetermined period is not calculated, or when the moving average has not reached the predetermined time (NO in step S20), the processing returns to step S1.

In contrast, when it is determined that the moving average of the medians for the predetermined period is calculated (YES in step S20), the stop place specifying unit 233 selects a stop place closest to a calculated moving average value from among multiple stop places provided in advance, in step S21.

In subsequent step S22, the stop place specifying unit 233 calculates a stop probability, which indicates a probability that the one mobility 1 stops at the stop place, in accordance with a distance between the calculated moving average value and the coordinates of the selected stop place.

Here, a method for calculating a stop probability of one mobility 1 will be described.

Figure 8:
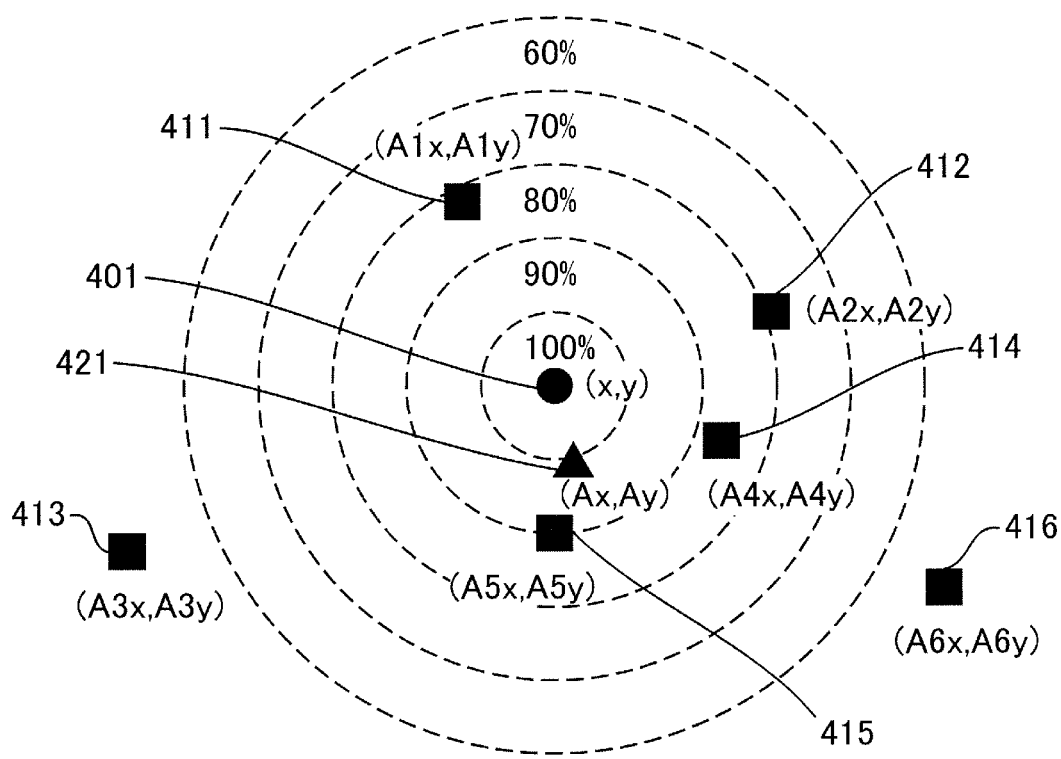
FIG. 8 is a diagram for illustrating a method for calculating a stop probability of one mobility according to the present embodiment.

FIG. 8 is a diagram for illustrating the method for calculating a stop probability of one mobility according to the present embodiment.

FIG. 8 illustrates a point 401 that indicates coordinates of a stop place (x, y), points 411 to 416 that respectively indicate six coordinates (A1$x$, A1$y$) to (A6$x$, A6$y$) of one mobility 1 that stops and does not mutually receive a mobility ID of another mobility, and point 421 that indicates a moving average value (A$x$, A$y$) of medians of the coordinates of the one mobility 1. FIG. 8 illustrates also multiple circles indicated by dotted lines that represent locations away from the stop place as a center by 10 m, 20 m, 30 m, 40 m, and 50 m.

When the distance between the calculated moving average value and the coordinates of the selected stop place is 10 m or less, the stop place specifying unit 233 sets the stop probability to 100%. When the distance between the calculated moving average value and the coordinates of the selected stop place is more than 10 m and 20 m or less, the stop place specifying unit 233 sets the stop probability to 90%. As described above, each time when the stop place specifying unit 233 reduces the stop probability by 10%, the distance between the calculated moving average value and the coordinates of the selected stop place increases by 10 m. The stop place specifying unit 233 raises the stop probability when the calculated moving average value is close to the selected stop place, and lowers the stop probability when the calculated moving average value is far from the selected stop place.

Returning to FIG. 6, in subsequent step S23, the stop place specifying unit 233 determines whether the calculated stop probability is equal to or more than a threshold. The threshold is 80%, for example.

Here, when it is determined that the stop probability is equal to or more than the threshold (YES in step S23), the stop place specifying unit 233 specifies the selected stop place as a stop place of the one mobility 1 in step S24.

In subsequent step S25, the communication unit 21 notifies an administrator of the multiple mobilities 1 of the specified stop place of the one mobility 1. At this time, the communication unit 21 transmits the specified stop place of the one mobility 1 and the mobility ID of the one mobility 1 to an information terminal of the administrator. The processing returns to step S1 after the processing of step S25.

After the stop probability of the one mobility 1 is calculated, the stop place specifying unit 233 may continue to use the calculated stop probability until the one mobility 1 starts moving. The stop place specifying unit 233 may also continue to use the calculated stop probability until the server device 2 is restarted after the stop probability of the one mobility 1 is calculated.

In contrast, when it is determined that the stop probability is smaller than the threshold (NO in step S23), the communication unit 21 notifies the administrator of the multiple mobilities 1 that the stop place of the one mobility 1 cannot be specified, in step S26. At this time, the communication unit 21 transmits information, which indicates that the stop place of the one mobility 1 cannot be specified, to the information terminal of the administrator. The processing returns to step S1 after the processing of step S26.

This configuration enables estimating two or more mobilities 1, which can communicate with each other by near field communication, to be present at the same place, so that the two or more mobilities 1 can be classified into the same mobility group. Thus, even when the stop place has a poor radio wave condition and the two or more mobilities 1 stopping at the stop place vary in location information, the stop place where the mobility group stops is specified based on the location information on the two or more mobilities 1 that are classified into the same mobility group and that mutually receive identification information by near field communication. This configuration thus enables specifying a stop place, where two or more mobilities 1 stop, with high accuracy.

There is no frequent change in the radio wave condition, so that the processing in steps S4 and S5 in FIG. 4 and the processing of steps S16 and S17 in FIG. 6 may be performed by batch processing performed every predetermined period, such as about once a week, instead of being performed in real time. As a result, a processing load on the computer can be further reduced.

Although the stop place specifying unit 233 calculates the stop probability of the one mobility in accordance with the distance between the calculated moving average value and the coordinates of the stop place closest to the moving average value in the present embodiment, the present disclosure is not particularly limited thereto. The stop place specifying unit 233 may acquire a stop probability output from a prediction model by inputting multiple coordinates of one mobility 1 at predetermined time intervals to the prediction model. The prediction model is generated by machine learning using teacher data including coordinates measured by one mobility existing around a stop place and a stop probability that one mobility stops at the stop place. For example, the prediction model may be machine-learned to output a stop probability of 100% when receiving coordinates of one mobility that stops at the stop place, and output a stop probability of 0% when receiving coordinates of one mobility that does not stop at the stop place. Additionally, when receiving coordinates of one mobility that does not stop at the stop place, the prediction model may be machine-learned to acquire GPS variation data for one hour or the like and to reduce the stop probability by 10% as correct data every time when a distance between the coordinates of the one mobility and the coordinates of the stop place increases by 10 m, for example.

Although the variation determination unit 232 calculates a magnitude of a variation in location information on two or more mobilities 1 classified into a mobility group in the present embodiment, the present disclosure is not particularly limited thereto. The variation determination unit 232 may calculate a magnitude of a variation in distance between corresponding two or more mobilities classified into a mobility group. The variation determination unit 232 may determine whether the calculated magnitude of the variation is larger than a threshold. The magnitude of the variation is a standard deviation or a variance value, for example. The variation determination unit 232 may calculate a Euclidean distance between two points of corresponding two or more mobilities 1 classified into a mobility group, and may calculate a variance value of the calculated Euclidean distances. The variation determination unit 232 may determine whether the calculated variance value is larger than a threshold. When the calculated magnitude of the variation is larger than the threshold, the stop place specifying unit 233 may specify a stop place where the mobility group stops based on location information on the two or more mobilities classified into the mobility group.

The variation determination unit 232 may calculate a magnitude of a variation in distance between corresponding two or more mobilities classified into a mobility group based on Formula (1) below.

[Formula 1]

$$\sum_{i=1}^{N} \frac{\sum_{j=1, j \ne i}^{N} \text{DISTANCE}(Bi, Bj)}{(N-1)} \quad (1)$$

In Formula (1) above, N represents the number of two or more mobilities classified into the mobility group, and DISTANCE (Bi, Bj) represents a function for calculating a Euclidean distance between an i-th mobility and a j-th mobility among the two or more mobilities classified into the mobility group.

The variation determination unit 232 may calculate also an outlier by using the magnitude of the variation in distance between the corresponding two or more mobilities classified into the mobility group. Then, the variation determination unit 232 may exclude a mobility corresponding to the calculated outlier from the mobility group.

The variation determination unit 232 may calculate also a magnitude of a variation in distance between each of the two or more mobilities classified into the mobility group and a stop place present around the two or more mobilities. The variation determination unit 232 may determine whether the calculated magnitude of the variation is larger than a threshold. The magnitude of the variation is a standard deviation or a variance value, for example. The variation determination unit 232 may calculate a Euclidean distance between two points of each of the two or more mobilities 1 classified into the mobility group and the stop place, and may calculate a variance value of the calculated Euclidean distances. The variation determination unit 232 may determine whether the calculated variance value is larger than a threshold. When the calculated magnitude of the variation is larger than the threshold, the stop place specifying unit 233 may specify a stop place where the mobility group stops based on location information on the two or more mobilities classified into the mobility group.

The variation determination unit 232 may calculate also a magnitude of a variation in distance between each of the two or more mobilities classified into the mobility group and a stop place present around the two or more mobilities based on Formula (2) below.

[Formula 2]

$$\sum_{i=1}^{N} \text{DISTANCE}(Bi)/N \quad (2)$$

In Formula (2) above, N represents the number of two or more mobilities classified into the mobility group, and DISTANCE (Bi) represents a function for calculating a Euclidean distance between an i-th mobility among the two or more mobilities classified into the mobility group and the stop place.

The variation determination unit 232 may calculate also an outlier by using the magnitude of the variation in distance between each of the two or more mobilities classified into the mobility group and the stop place present around the two or more mobilities. Then, the variation determination unit 232 may exclude a mobility corresponding to the calculated outlier from the mobility group.

The variation determination unit 232 may also acquire a determination result as to whether the stop place is provided in a place with a poor radio wave condition by inputting coordinates of the two or more mobilities 1 classified into the mobility group to a prediction model. The prediction model is generated by machine learning using teacher data including coordinates measured by two or more mobilities 1 stopping at a stop place with a good radio wave condition, coordinates measured by two or more mobilities 1 stopping at a stop place with a poor radio wave condition, and a determination result as to whether the radio wave condition is good. For example, the prediction model may be subjected to machine learning to output a determination result indicating a good radio wave condition when receiving coordinates measured by two or more mobilities 1 stopping at a stop place with a good radio wave condition, and to output a determination result indicating a poor radio wave condition when receiving coordinates measured by two or more mobilities 1 stopping at a stop place with a poor radio wave condition.

Although the stop place specifying unit 233 specifies a stop place where a mobility group stops based on location information on two or more mobilities classified into the mobility group when a magnitude of a variation in the location information on the two or more mobilities classified into the mobility group is larger than the threshold in the present embodiment, the present disclosure is not particularly limited thereto. When the magnitude of the variation in the location information on the two or more mobilities classified into the mobility group is larger than the threshold, the stop place specifying unit 233 may estimate a place where the mobility group stops based on the location information on the two or more mobilities classified into the mobility group. This configuration enables estimating not only a stop place provided in advance, but also a place where the mobility group stops other than the stop place. For example, a location of a mobility returned at a place other than the stop place can be specified.

Although the stop place specifying unit 233 selects a stop place closest to the calculated moving average value from among the multiple stop places provided in advance in step S9 of FIG. 4 and step S21 of FIG. 6, the present disclosure is not particularly limited thereto. The stop place specifying unit 233 may select multiple stop places in order of proximity to the calculated moving average value from among the multiple stop places provided in advance, and present a placement probability to each stop place to a terminal of an operator managing mobility sharing service. In that case, the operator can select an appropriate stop place from among the multiple presented stop places in consideration of not only the placement probability obtained from a system but also a tendency of the stop places obtained from a daily service management operation. As a result, selection of the stop place can be improved in accuracy.

In each of the above embodiments, each component may be implemented by being configured with dedicated hardware or by executing a software program suitable for each component. Each component may be implemented by a program execution unit such as a CPU or a processor reading and executing a software program recorded on a recording medium such as a hard disk or a semiconductor memory.

Some or all of the functions of the devices according to the embodiment of the present disclosure are implemented as large scale integration (LSI), which is typically an integrated circuit. These may be individually integrated into one chip, or may be integrated into one chip so as to include some or all of them. The integrated circuit is not limited to the LSI, and may be implemented by a dedicated circuit or a general-purpose processor. Available examples include a field programmable gate array (FPGA) that can be programmed after manufacturing of LSI, and a reconfigurable processor in which connections and settings of circuit cells inside LSI can be reconfigured.

Some or all of the functions of the devices according to the embodiments of the present disclosure may be implemented by executing a program with a processor such as a CPU.

The numbers used above are merely examples for specifically describing the present disclosure, and the present disclosure is not limited to the illustrated numbers.

The order in which each step illustrated in the above flowchart is performed is for specifically describing the present disclosure, and may be an order other than the above order as long as a similar effect can be obtained. Some of the above steps may be executed simultaneously (concurrently) with other steps.

INDUSTRIAL APPLICABILITY

The technique according to the present disclosure can specify a stop place where two or more mobilities stop with high accuracy, and thus is useful for a technique of specifying a location where multiple mobilities stop.

The invention claimed is:

1. An information processing method comprising, by a computer:
acquiring, from a first mobility, first location information indicating a location of the first mobility, second identification information on a second mobility, the second identification information being received by the first mobility from the second mobility by near field communication, and first stop information indicating whether the first mobility stops;
acquiring, from the second mobility, second location information indicating a location of the second mobility, first identification information on the first mobility, the first identification information being received by the second mobility from the first mobility by near field communication, and second stop information indicating whether the second mobility stops;
classifying, into a same mobility group, the first mobility stopping and receiving the second identification information and the second mobility stopping and receiving the first identification information; and
specifying a stop place where the mobility group stops based on the first location information on the first mobility and the second location information on the second mobility, the first mobility and the second mobility being classified into the mobility group.

2. The information processing method according to claim 1, wherein
the specifying the stop place includes:
calculating medians of coordinates of the first mobility and the second mobility;
calculating a moving average of the calculated medians within a predetermined period;
calculating a stop probability indicating a probability that the mobility group stops at the stop place in accordance with a distance between a calculated moving average value and coordinates of a stop place closest to the moving average value; and
specifying the stop place closest to the moving average value as the stop place where the mobility group stops when the stop probability is equal to or more than a threshold.

3. The information processing method according to claim 1, further comprising specifying a stop place where a third mobility stops based on multiple pieces of third location information on the third mobility stopping and that has not received the first identification information on the first mobility and the second identification information on the second mobility, and that has a variation in the multiple pieces of the third location information acquired at predetermined time intervals.

4. The information processing method according to claim 3, wherein
the specifying the stop place includes:
calculating medians of multiple coordinates of the third mobility, being acquired at predetermined time intervals;
calculating a moving average of the calculated medians within a predetermined period;
calculating a stop probability indicating a probability that the third mobility stops at the stop place in accordance with a distance between a calculated moving average value and coordinates of a stop place closest to the moving average value; and
specifying the stop place closest to the moving average value as the stop place where the third mobility stops when the stop probability is equal to or more than a threshold.

5. The information processing method according to claim 1, further comprising:
when any one of the first identification information on the first mobility and the second identification information on the second mobility is acquired from a fourth mobility that is not classified into the mobility group, classifying the fourth mobility into the same mobility group as the first mobility and the second mobility; and
specifying the stop place where the mobility group stops as a stop place where the fourth mobility stops.

6. The information processing method according to claim 1, further comprising calculating a magnitude of a variation in the first location information on the first mobility and the second location information on the second mobility, the first mobility and the second mobility being classified into the mobility group,
 wherein in the specifying the stop place, when the calculated magnitude of the variation is larger than a threshold, the stop place where the mobility group stops is specified based on the first location information on the first mobility and the second location information on the second mobility, the first mobility and the second mobility being classified into the mobility group.

7. The information processing method according to claim 1, further comprising calculating a magnitude of a variation in distance between the first mobility and the second mobility classified into the mobility group,
 wherein in the specifying the stop place, when the calculated magnitude of the variation is larger than a threshold, the stop place where the mobility group stops is specified based on the first location information on the first mobility and the second location information on the second mobility, the first mobility and the second mobility being on classified into the mobility group.

8. The information processing method according to claim 1, further comprising calculating a magnitude of a variation in distance between each of the first mobility and the second mobility classified into the mobility group and the stop place existing around the first mobility and the second mobility,
 wherein in the specifying the stop place, when the calculated magnitude of the variation is larger than a threshold, the stop place where the mobility group stops is specified based on the first location information on the first mobility and the second location information on the second mobility, the first mobility and the second mobility being classified into the mobility group.

9. The information processing method according to claim 1, further comprising:
 calculating a magnitude of a variation in the first location information on the first mobility and the second location information on the second mobility, the first mobility and the second mobility being classified into the mobility group; and
 estimating a place where the mobility group stops based on the first location information on the first mobility and the second location information on the second mobility when the calculated magnitude of the variation is larger than a threshold, the first mobility and the second mobility being classified into the mobility group.

10. An information processing device comprising:
 a processor, in cooperation with a memory, performs operations including:
 acquiring, from a first mobility, first location information indicating a location of the first mobility, second identification information on a second mobility, the second identification information being received by the first mobility from the second mobility by near field communication, and first stop information indicating whether the first mobility stops;
 acquiring, from the second mobility, second location information indicating a location of the second mobility, first identification information on the first mobility, the first identification information being received by the second mobility from the first mobility by near field communication, and second stop information indicating whether the second mobility stops;
 classifying, into a same mobility group, the first mobility stopping and receiving the second identification information and the second mobility stopping and receiving the first identification information; and
 specifying a stop place where the mobility group stops based on the first location information on the first mobility and the second location information on the second mobility, the first mobility and the second mobility being classified into the mobility group.

11. A non-transitory computer readable recording medium storing an information processing program that causes a computer to execute functions of:
 acquiring, from a first mobility, first location information indicating a location of the first mobility, second identification information on a second mobility, the second identification information being received by the first mobility from the second mobility by near field communication, and first stop information indicating whether the first mobility stops;
 acquiring, from the second mobility, second location information indicating a location of the second mobility, first identification information on the first mobility, the first identification information being received by the second mobility from the first mobility by near field communication, and second stop information indicating whether the second mobility stops;
 classifying, into a same mobility group, the first mobility stopping and receiving the second identification information and the second mobility stopping and receiving the first identification information; and
 specifying a stop place where the mobility group stops based on the first location information on the first mobility and the second location information on the second mobility, the first mobility and the second mobility being classified into the mobility group.

* * * * *